J. CASE.
CULTIVATOR.
No. 41,423.                    Patented Feb. 2, 1864.
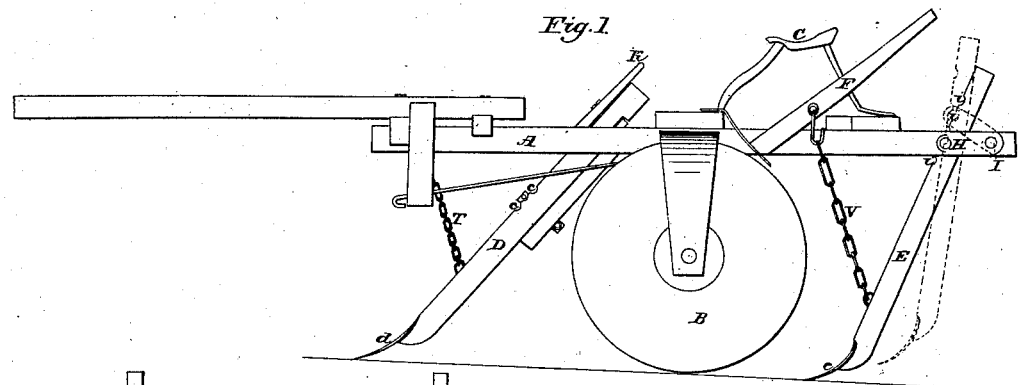
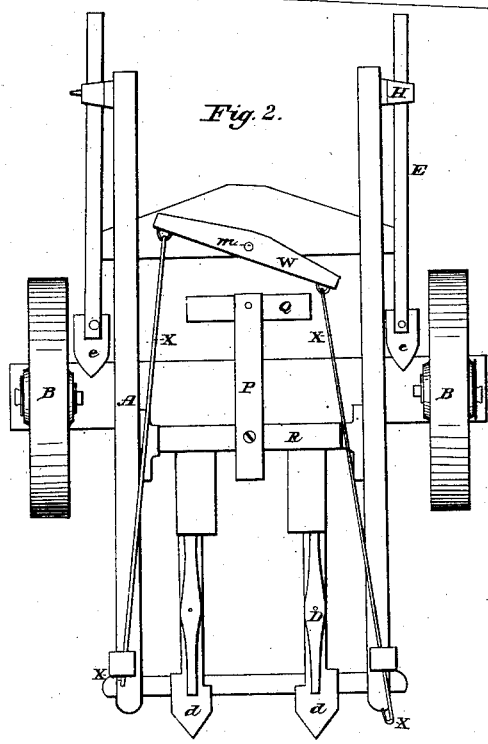
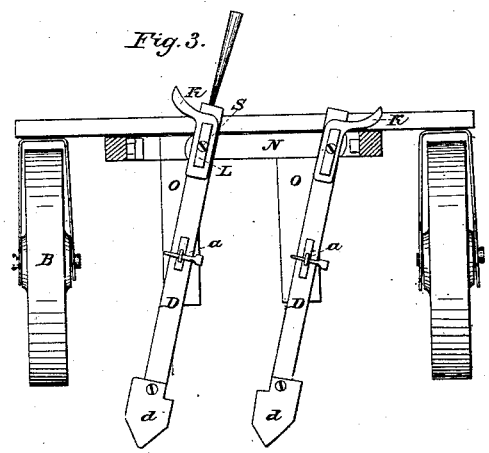

UNITED STATES PATENT OFFICE.

JARVIS CASE, OF LA FAYETTE, INDIANA.

IMPROVEMENT IN CULTIVATORS.

Specification forming part of Letters Patent No. 41,423, dated February 2, 1864.

*To all whom it may concern:*

Be it known that I, JARVIS CASE, of La Fayette, in the county of Tippecanoe and State of Indiana, have invented a new and useful Improvement in Cultivators; and I do hereby declare that the following is a full and exact description thereof, reference being had to the accompanying drawings, and to the letters of reference marked thereon.

My invention consists in certain new improvements for attaching the plow-stocks to the frame, and for controlling the same.

In the accompanying drawings, Figure 1 is a side elevation of my cultivator. Fig. 2 is a bottom view of the same. Fig. 3 is a transverse section of the frame, showing part of the front removed.

The frame A of my machine is mounted high above the wheels B, in order to pass tall corn and other crops. The driver's seat is placed behind the axle at C, Fig. 1, where he can watch the forward plows, $d$, and the team at the same time, and follow the row of corn. By putting his feet upon the stirrups K the driver can easily move the shovels $d$ to the right or left for the purpose of following crooked rows of corn, or keeping the plows in proper position when the machine travels too far to the right or left. The plow-stocks D D', being pivoted low down on arms O, at the fulcra $a$, Fig. 3, and connected by the pivoted bar N, are easily operated by one or both feet. An arm or lever, M, is also within the driver's reach, so that the hand may assist the feet, if desirable—as in the case of crippled feet. The stirrups K are adjustable upon the stocks by means of slots L and screws S, in order to suit legs of different length.

The stocks D are also adjustable up and down on the arms O. By means of a rock-shaft, R, and treadle P Q the driver can, with his foot, throw the shovels $d$ out of the ground, or clear them of weeds or other obstructions.

As mentioned above, the driver can keep his eye on the forward shovel and the team at the same time. This is very important in the cultivation of small corn, which is not so readily seen and is more liable to be accidentally covered. When such accident occurs the driver can stop the machine in time to uncover the corn (by means of a stick) without leaving his seat.

The rear plow-stock, E, is connected to the frame by means of hinged or pivoted stock-holders H, which allow the stocks to rise in relation to the frame, as shown in red lines, Fig. 1. On account of this pivoted stock-holder H the stock E will rise automatically when the plow strikes a stone or other obstruction. The action of the stock-holder, in connection with the lever F and chain V, enables the driver to raise the plow more easily, and thus clear it of weeds, or release it from a stone without backing the machine. When the stock E rises the change of position throws a greater strain upon the pin, thus tending to break the pin $i$ and relieve the plow. The double tree W and draft-rods H throw the strain of the horses upon the whole frame, instead of a single shovel, in striking a stone, thus preventing the breaking of the machine. This double-tree is held by a bolt, $m$, which will break before breaking the plows.

I do not broadly claim a rocker and treadle for raising the plows; but I believe it is new to arrange such treadle in advance of the driver's seat, so that both the rocker and plows will be in view as the driver watches his team and the row of corn. Therefore I confine my claims to such peculiar arrangement.

Having thus fully described my invention, what I claim, and desire to secure by Letters Patent, is—

1. The combination of the pivoted stocks D D' with the arms O, and pivoted bar N, operated by the stirrups K and lever M, or by either of the same, substantially as set forth.

2. Placing the treadle P Q and stocks D D' forward of the driver's seat, the same being arranged and operated substantially in the manner and for the purposes specified.

3. The hinged stock-holders H, for holding the stocks E and allowing the latter to rise in relation to the frame, substantially as described.

In testimony whereof I have hereunto set my hand, this 9th day of October, 1863, in the presence of two subscribing witnesses.

JARVIS CASE.

Attest:
JOHN S. ALLEN,
WM. TAYLOR.